United States Patent
Somhegyi

(10) Patent No.: US 12,443,403 B2
(45) Date of Patent: Oct. 14, 2025

(54) FIRMWARE UPLOAD USING BLE CONNECTION TO BLUETOOTH MESH FIRMWARE DISTRIBUTOR NODE

(71) Applicant: Silicon Laboratories Inc., Austin, TX (US)

(72) Inventor: Tamas Somhegyi, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 196 days.

(21) Appl. No.: 18/231,473

(22) Filed: Aug. 8, 2023

(65) Prior Publication Data
US 2025/0053403 A1  Feb. 13, 2025

(51) Int. Cl.
G06F 8/65  (2018.01)
H04W 4/80  (2018.01)

(52) U.S. Cl.
CPC ............... G06F 8/65 (2013.01); H04W 4/80 (2018.02)

(58) Field of Classification Search
CPC ............................. G06F 8/60–66; H04W 4/80
See application file for complete search history.

(56) References Cited

U.S. PATENT DOCUMENTS

2022/0385400 A1* 12/2022 Sun ........................... H04L 1/08
2023/0179668 A1*  6/2023 Lin ......................... H04W 84/18
                                                                717/172

FOREIGN PATENT DOCUMENTS

WO   WO-2018230933 A1 * 12/2018 ............... G06F 8/65

OTHER PUBLICATIONS

Kanafek, P., Solving real-world challenges: The new features of Bluetooth Mesh 1.1, Nordic DevZone, Jun. 15, 2023, 11 pages, [retrieved on Apr. 15, 2025], Retrieved from the Internet: <URL:https://devzone.nordicsemi.com/nordic/nordic-blog/b/blog/posts/solving-real-world-challenges-the-new-features-of-bluetooth-mesh-1-1>.*
Silicon Laboratories, Inc., AN984: Bluetooth Low Energy Software, Implementing Over-the-Air Firmware Upgrade, Version 1.10. 30 pages, Dec. 2, 2020.

* cited by examiner

*Primary Examiner* — Geoffrey R St Leger
(74) *Attorney, Agent, or Firm* — Nields, Lemack & Frame, LLC

(57) ABSTRACT

A system and method for uploading a new firmware image to a distributor node is disclosed. The distributor node is part of a Bluetooth mesh network. In some embodiments, one of an initiator node or the distributor node includes a GATT database. A GATT client (which may be the distributor node or the initiator node) connects with the GATT database and BLE messages are used to transmit the firmware image. These BLE messages do not have the constraints that are imposed on mesh messages, and therefore the upload occurs much more quickly. This technique is compliant with the Upload Firmware Out of Band (OOB) procedure defined in the Bluetooth Mesh specification. In another embodiment, the firmware image is transmitted from the initiator node to the distributor node using a L2CAP channel.

18 Claims, 8 Drawing Sheets

FIRMWARE UPLOAD USING BLE CONNECTION TO BLUETOOTH MESH FIRMWARE DISTRIBUTOR NODE

FIELD

This disclosure describes a system and method for uploading a new firmware image to a Bluetooth Mesh Firmware Distributor Node.

BACKGROUND

The Bluetooth protocol is one of many wireless network protocols that are currently in use. The Bluetooth protocol is commonly used to connect smartphones to watches, headphones, speakers, and other accessories. Bluetooth Low Energy utilizes 40 physical channels in the 2.4 GHZ ISM band, each channel separated by 2 MHZ.

The Bluetooth protocol has been expanded to include mesh networks, which is defined in the Bluetooth Mesh specification. Mesh networks are characterized by packet flooding, where packets are propagated by the retransmission of that packet by multiple devices in the mesh network. Further, in many mesh networks, devices are not within listening range of all of the other devices in the mesh network, and therefore each device relies on these retransmissions to receive packets from distant devices.

The Bluetooth Mesh specification defines several mechanisms by which the firmware resident on the mesh devices may be updated. One mechanism is a direct approach, wherein the initiator node transmits the new firmware image directly to the mesh devices that are to be updated. There is also an indirect approach wherein the initiator node uploads the new firmware image to a distributor node, which then distributes the firmware images to the selected updating mesh devices.

The indirect approach is useful when the operator needs to distribute firmware to many devices on a mesh network. For example, the operator with a mobile telephone may upload the new firmware image to the distributor node. Once this transfer is complete, the user is free to exit the premises, knowing that the distributor node will distribute the new firmware image throughout the mesh network.

To be advantageous, the indirect approach should allow faster uploads than the direct approach since the user must remain in the listening range of the distributor node. However, using the techniques defined in the Bluetooth Mesh specification, these uploads may be very time consuming. For example, a 400 kB firmware image may require more than 20 minutes to upload from the user to the distributor node. The cause of this lengthy process is due to the Binary Large Object (BLOB) transfer procedure defined in the Bluetooth Mesh specification. A BLOB transfer is a block-based procedure which divides the data into blocks, which are then further divided into chunks. These chunks are then transferred using BLOB Chunk Transfer mesh access messages, which is segmented to fit into mesh network messages. Specifically, a segmented mesh message may be sent every segment interval (which is at least 10 ms), and typically contains about 12 bytes of actual data. This results in a transfer rate of only 1.2 KB/s. Furthermore, other procedures and protocols add additional overhead reducing this transfer rate even further.

Therefore, a method of uploading a firmware image to a distributor node that reduces the time currently required for this operation would be beneficial. Further, it would be advantageous if this new method complied with existing Bluetooth, Bluetooth Low Energy (BLE) and Bluetooth mesh specifications.

SUMMARY

A system and method for uploading a new firmware image to a distributor node is disclosed. The distributor node is part of a Bluetooth mesh network. In some embodiments, one of the initiator node or the distributor node includes a GATT database. The GATT client (which may be the distributor node or the initiator node) connects with the GATT database and BLE messages are used to transmit the firmware image. These BLE messages do not have the constraints that are imposed on mesh messages, and therefore the upload occurs much more quickly. This technique is compliant with the Upload Firmware Out of Band (OOB) procedure defined in the Bluetooth Mesh specification. In another embodiment, the firmware image is transmitted from the initiator node to the distributor node using a L2CAP channel.

According to one embodiment, a method of uploading a new firmware image to one or more network devices in a Bluetooth mesh network is disclosed. The method comprises transmitting from an initiator node a standard Bluetooth Mesh packet, referred to as a Mesh Firmware Distribution Upload OOB Start PDU, which indicates an out of band firmware upload is being commenced; uploading the new firmware image from the initiator node to a distributor node, wherein the new firmware image is transferred using BLE protocol data units (PDUs); transmitting from the initiator node a standard Bluetooth Mesh packet, referred to as a Mesh Firmware Distribution Upload Get PDU, to obtain status of the firmware upload; and using the distributor node to transmit the new firmware image to the one or more network devices using standard Bluetooth Mesh PDUs. In some embodiments, the initiator node uses a proxy node to transmit the Mesh Firmware Distribution Upload OOB Start PDU and Mesh Firmware Distribution Upload Get PDU. In certain embodiments, the distributor node serves as the proxy node. In some embodiments, the initiator node uses mesh advertisements to transmit the Mesh Firmware Distribution Upload OOB Start PDU and Mesh Firmware Distribution Upload Get PDU. In some embodiments, the new firmware image is transmitted to the distributor node through use of a GATT database. In certain embodiments, the GATT database comprises an Out of Band (OOB) Firmware Upload Service. In some embodiments, the GATT database is disposed in the distributor node. In certain embodiments, the initiator node uses a proxy node to transmit the Mesh Firmware Distribution Upload OOB Start PDU and Mesh Firmware Distribution Upload Get PDU, and the GATT database comprises a Mesh Proxy service. In some embodiments, the GATT database is disposed in the initiator node. In some embodiments, the new firmware image is transmitted through use of a L2CAP channel. In some embodiments, prior to uploading the new firmware image, the initiator node creates a BLE connection to the distributor node. In some embodiments, the BLE connection is created using LE Secure Connection Pairing with Encryption. In certain embodiments, the new firmware image is transmitted using the BLE connection.

According to another embodiment, a system for updating firmware to a plurality of mesh devices in a Bluetooth mesh network is disclosed. The system comprises a distributor node, in communication with the plurality of mesh devices in the Bluetooth mesh network, and the distributor node comprises a GATT database, the GATT database comprising an Out of Band (OOB) Firmware Upload Service; and an initiator node, which contains a new firmware image, and the initiator node creates a BLE connection to the distributor node and transmits the new firmware image to the distributor node using the GATT database. In some embodiments, the initiator node transmits a standard Bluetooth Mesh packet, referred to as a Mesh Firmware Distribution Upload OOB Start PDU, which indicates an out of band firmware upload is being commenced, prior to transmitting the new firmware image. In some embodiments, the initiator node transmits a standard Bluetooth Mesh packet, referred to as a Mesh Firmware Distribution Upload Get PDU, to obtain status of the firmware upload after transmitting the new firmware image. In certain embodiments, the GATT database comprises a Mesh Proxy service, and the initiator node transmits the Mesh Firmware Distribution Upload OOB Start PDU and the Mesh Firmware Distribution Upload Get PDU using the Mesh Proxy Service. In some embodiments, the BLE connection is created using LE Secure Connection Pairing with Encryption.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
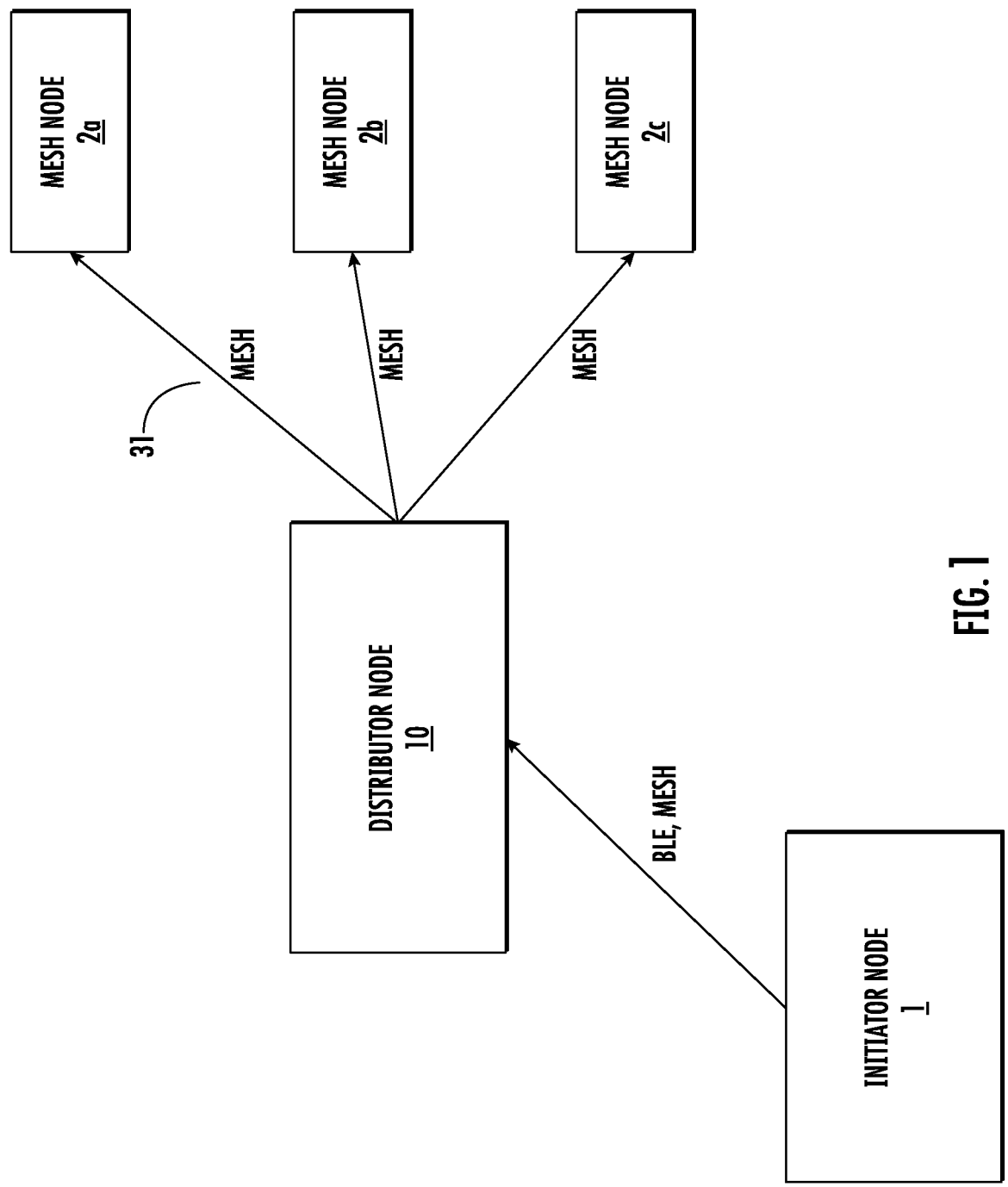
FIG. 1 shows a network topology with an initiator node, a distributor node and multiple mesh nodes.

FIG. 1 shows a network topology of a Bluetooth mesh network. The system includes an initiator node 1. This initiator node may be any device that includes a Bluetooth interface. For example, the initiator node 1 may be a laptop computer, a personal computer, a mobile telephone or another suitable device. The distributor node 10 and the mesh nodes 2a-2c may be Bluetooth devices. Note that communications between the distributor node 10 and the mesh nodes 2a-2c utilize Bluetooth Mesh protocol, while communications between the initiator node 1 and the distributor node 10 may include both BLE and Bluetooth mesh protocols.

Figure 2:
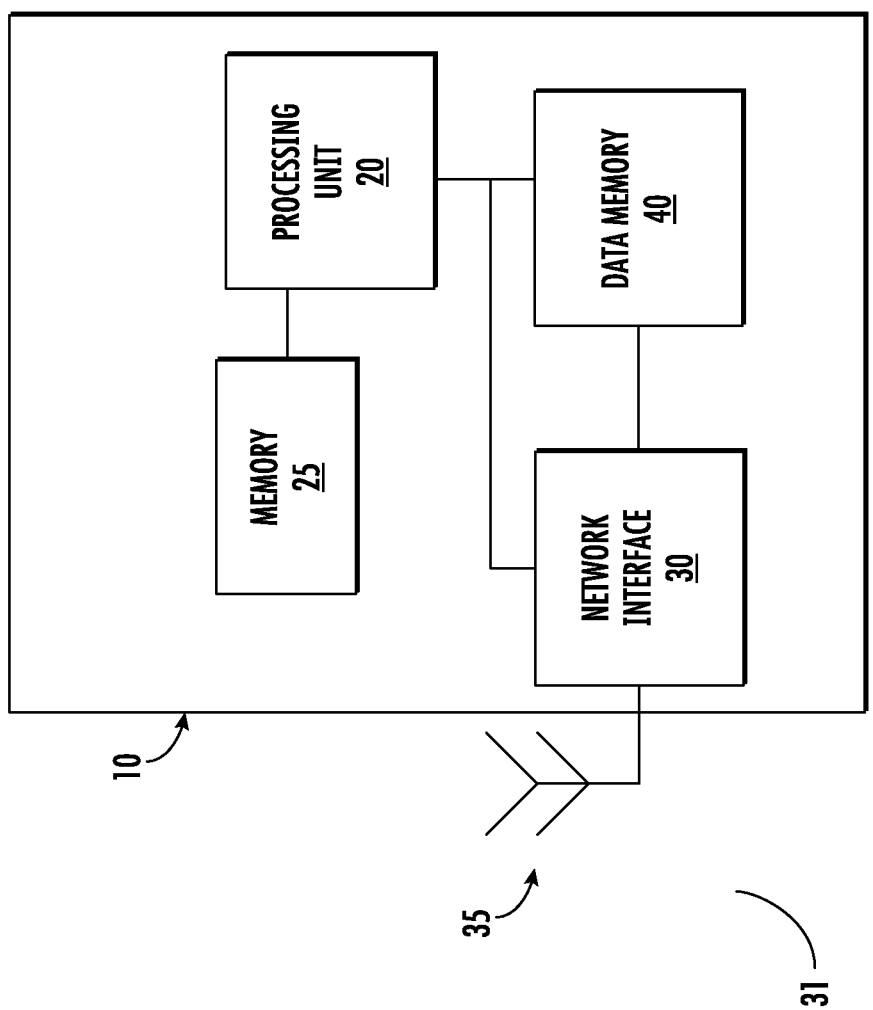
FIG. 2 shows a block diagram of the distributor node and mesh nodes according to one embodiment.

FIG. 2 shows a block diagram of a representative Bluetooth device that may be used as the distributor node 10 or the mesh nodes 2a-2c.

The Bluetooth device has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the Bluetooth device to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the Bluetooth device. The instructions contained on this second computer readable non-transitory media may be downloaded onto the memory device 25 to allow execution of the instructions by the Bluetooth device.

The Bluetooth device also includes a Bluetooth network interface 30 that connects with a Bluetooth mesh network 31 using an antenna 35.

The Bluetooth device may include a data memory device 40 in which data that is received and transmitted by the Bluetooth network interface 30 is stored. This data memory device 40 is traditionally a volatile memory. The processing unit 20 has the ability to read and write the data memory device 40 so as to communicate with the other devices in the Bluetooth mesh network 31.

Although not shown, the Bluetooth device also has a power supply, which may be a battery or a connection to a permanent power source, such as a wall outlet.

While the processing unit 20, the memory device 25, the Bluetooth network interface 30 and the data memory device 40 are shown in FIG. 2 as separate components, it is understood that some or all of these components may be integrated into a single electronic component. Rather, FIG. 2 is used to illustrate the functionality of the Bluetooth device, not its physical configuration. Further, the distributor node 10 may have more capabilities than the mesh nodes 2a-2c, in terms of processing power, memory size and power consumption.

In certain embodiments, the distributor node 10 also includes a GATT database 200. GATT (Generic Attribute profile) describes the client-server model used in Bluetooth LE (BLE) to communicate between devices. The GATT defines the interactions between the client and server as well as the GATT database structure which is used to exchange the data between the GATT server and client. The GATT database includes attributes. The most important types of attributes are services, characteristics and descriptors.

A service is a collection of data and associated behaviors to accomplish a particular function or feature and it may contain included services, mandatory characteristics, and optional characteristics. There are two types of services: primary service and secondary service. Primary services can be discovered by a client using a Primary Service Discovery procedure. Secondary services can be included in other services.

A characteristic is a value used in a service along with properties and configuration information about how the value is accessed and information about how the value is displayed or represented. This is the entity used mainly to transfer data between client and server. A characteristic has some properties which define permissions regarding how the client can interact with the characteristic as well as optional descriptors.

As an example, BLE defines Battery as a Service, where one of the characteristics is the battery level.

Each attribute has a handle that can be used to refer to that particular attribute as well as universally unique identifier (UUID) which is used to identify the type of the attribute.

The GATT database may be accessed using ATT (Attribute protocol). ATT defines a set of packets that are used to find, read, write, notify, and indicate attributes. The packets may be one of the following types: a command, a request, a response, a notification, an indication, or a confirmation. A command is a first packet where the client sends a command packet to the server requesting some action, where there is no response from the server. Requests are similar to commands in that they are transmitted by the client, however, a response from the server always follows a request. Notifications and indications are used by the server to push information to the client. Notifications do not require a response from the client. However, indications need to be acknowledged by the client. This is done through the use of a Confirmation packet.

Communications between a GATT client and a GATT server are controlled by ATT. All ATT requests are sent over an ATT bearer. An ATT bearer is a channel used to send Attribute protocol packets. Each ATT bearer uses an L2CAP (Logical Link Control and Adaptation Protocol) channel.

Figure 3:
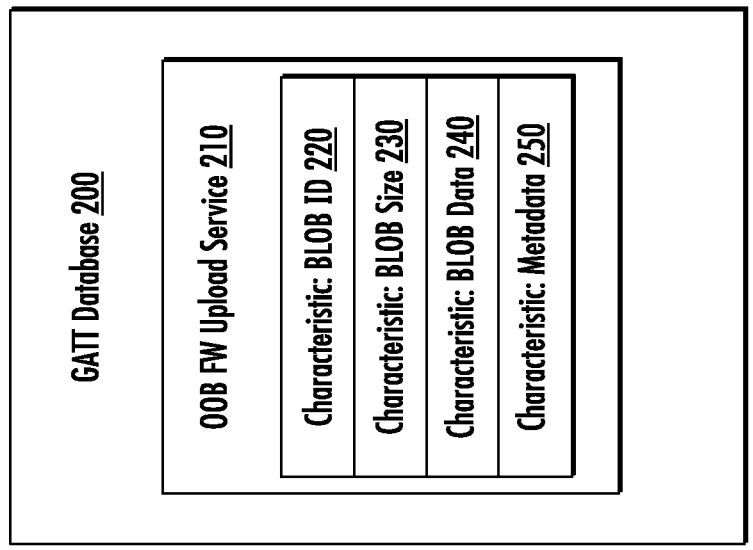
FIG. 3 shows the configuration of the GATT database according to one embodiment.

FIG. 3 shows a view of the GATT database 200 which may be located in the distributor node 10 according to one embodiment. In this embodiment, the GATT database 200 includes a service, referred to as the Out of Band (OOB) Firmware Upload Service 210. Within the OOB Firmware Upload Service 210 are a plurality of characteristics. In this embodiment, there is a characteristic that identifies the name of the binary large object (BLOB), referred to as the BLOB ID 220. This characteristic corresponds to a parameter that is used in the Firmware Distribution Upload OOB Start message that is defined in the Bluetooth Mesh specification, as described in more detail below. There may be a second characteristic that represents the size of the BLOB, referred to as BLOB Size 230. This may be used to allow the distributor node 10 to verify that it has received all of the bytes contained in the firmware image. Additionally, there may be a characteristic referred to as BLOB Data 240. This is the characteristic that the initiator node 1 will transmit the firmware image to. Finally, to be consistent with the Bluetooth Mesh specification, there may be a characteristic referred to as Metadata 250. This characteristic represents the vendor specific firmware metadata defined in the Mesh Device Firmware Update Model specification. In this embodiment, all of these characteristics are write only. In certain embodiments, writing these characteristics requires LE Secure Connection Pairing with Encryption. This protocol is defined in the Bluetooth specification.

Note that FIG. 3 represents only one embodiment. In other embodiments, there may be additional characteristics associated with the OOB Firmware Upload Service 210. Additionally, in certain embodiments, some of the characteristics described herein may not be present. For example, the BLOB ID 220 may be eliminated. Further, note that the names of the characteristics may also be different in other embodiments.

Figure 4:
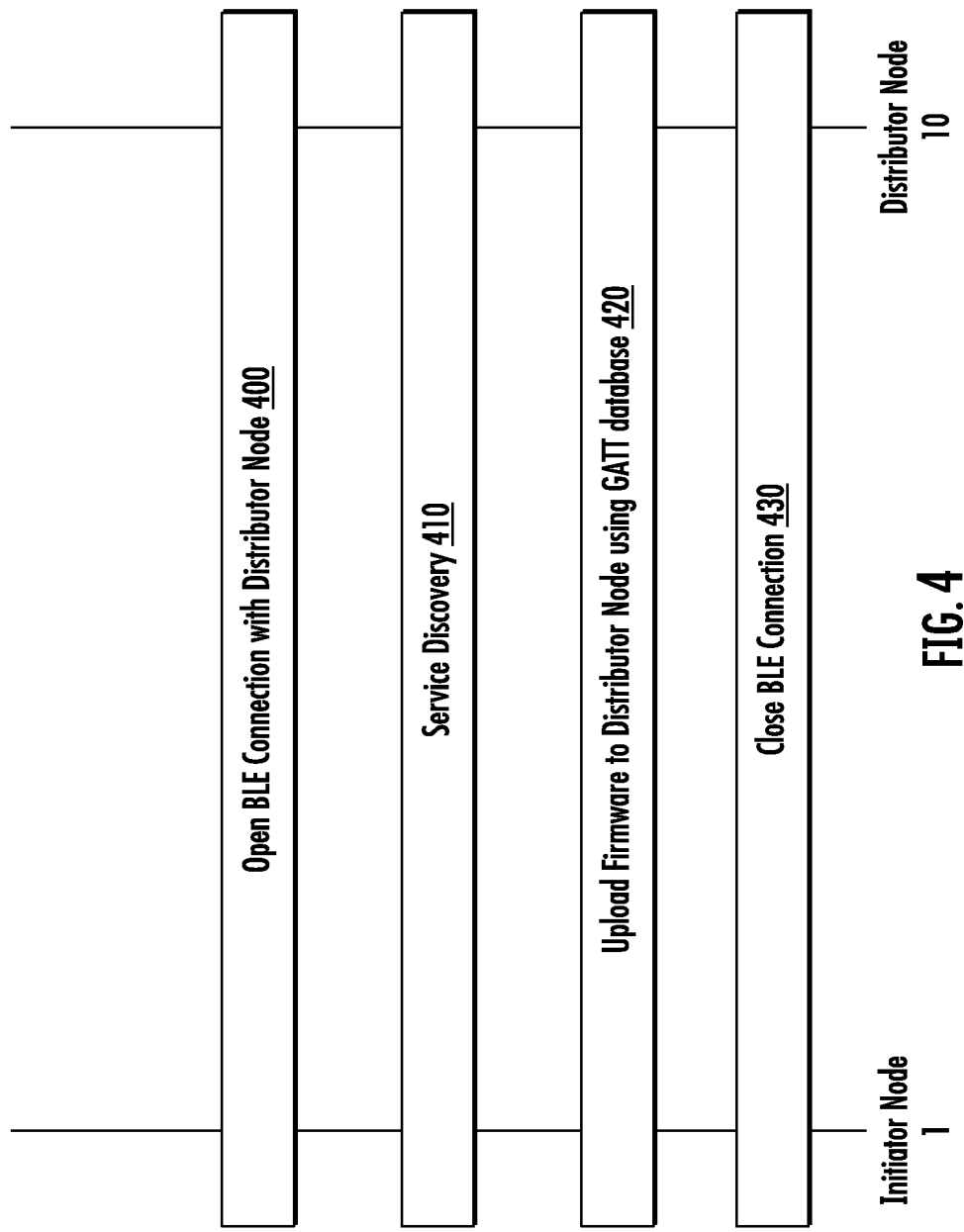
FIG. 4 is a diagram showing the sequence used to transfer a new firmware image from the initiator node to the distributor node.

FIG. 4 shows a high level sequence that is used to upload the firmware image from the initiator node 1 to the distributor node 10. First, as shown in Box 400, the initiator node 1 creates a BLE connection to the distributor node 10. In some embodiments, the initiator node 1 uses this BLE connection to send and receive mesh messages through the Proxy protocol. The Proxy protocol is a GATT-based communication over a regular BLE connection, which makes it possible to send and receive packets to the mesh network through the Mesh Proxy (GATT) Service. The Proxy protocol enables nodes to send and receive Network PDUs, mesh beacons, proxy configuration messages and Provisioning PDUs over a connection-oriented bearer. For example, a node may support GATT but not be able to advertise the Mesh Message AD Type. This node will establish a GATT connection with another node that supports the GATT bearer and the advertising bearer, using the Proxy protocol to forward messages between these bearers. As noted above, this BLE connection may be established using LE Secure Connection Pairing with Encryption.

Next, as shown in Box 410, the initiator node 1 discovers the services that are available in the GATT database 200 in the distributor node 10. The service discovery is a standard process of GATT-based communication to obtain the handle of each characteristic of the OOB Firmware Upload Service. When a GATT client wants to access a GATT server, the process usually begins by querying the GATT database contents. This commences with a primary service discovery, which returns the handles of all primary services in the GATT database. This can then be followed by querying the characteristics contained in each service and optionally reading the values of each characteristic that supports read operations. Alternatively, the GATT client can directly query a certain attribute, such as a characteristic, using the UUID to find its handle. The GATT client can then communicate with the GATT server by reading and writing the characteristic values. This process is described in more detail below with respect to FIG. 5.

In some embodiments, there may also be a Mesh Proxy Service in the GATT database 200. This Mesh Proxy Service makes it possible to send and receive mesh messages through Proxy protocol by a device (such as the initiator node 1) which is not able to use advertising bearer (ADV-bearer) directly. In general, proxy nodes expose a GATT interface which Bluetooth LE devices may use to interact with a mesh network. A protocol called the Mesh Proxy Protocol, intended to be used with a connection oriented bearer, such as GATT, is defined. GATT devices read and write Proxy Protocol PDUs from within GATT characteristics implemented by the proxy node. The proxy node transforms these PDUs to/from mesh PDUs. Thus, proxy nodes allow Bluetooth LE devices that do not possess a Bluetooth mesh stack to interact with nodes in a mesh network. In one embodiment, the initiator node 1 writes the Mesh Proxy Data In characteristic in the Mesh Proxy Service of the GATT database and the distributor node 10 sends Bluetooth Mesh PDUs to the Bluetooth mesh network 31. Further, the initiator node 1 may also receive mesh packets from the Bluetooth mesh network 31 through notification of the Mesh Proxy Data Out characteristic by the distributor node 10. The use of Mesh Proxy connections is defined in the Bluetooth Mesh specification.

In another embodiment, where the initiator node 1 is able to send mesh messages through ADV-bearer, proxy communication over a BLE connection is not required and the BLE connection can be used for the proprietary firmware data transfer only.

In some embodiments, the use of a Mesh Proxy Service may be advantageous since there is already an open BLE connection. This mechanism may be less error prone due to the automatic link layer retransmissions which is not available for ADV-bearer based mesh messaging.

Next, as shown in Box 420, the initiator node 1 uploads the firmware image to the distributor node 10 using the GATT database 200. This is explained in more detail below with respect to FIGS. 6 and 8.

Finally, as shown in Box 430, the initiator node 1 may then close the BLE connection with the distributor node 10.

After this, the distributor node 10 is able to update the firmware image on the mesh nodes 2a-2c. This is done using standard Bluetooth Mesh PDUs. The firmware distribution mechanism is defined in various specifications, including the Mesh Device Firmware Update Model and the Mesh Binary Large Object Transfer Model.

Figure 5:
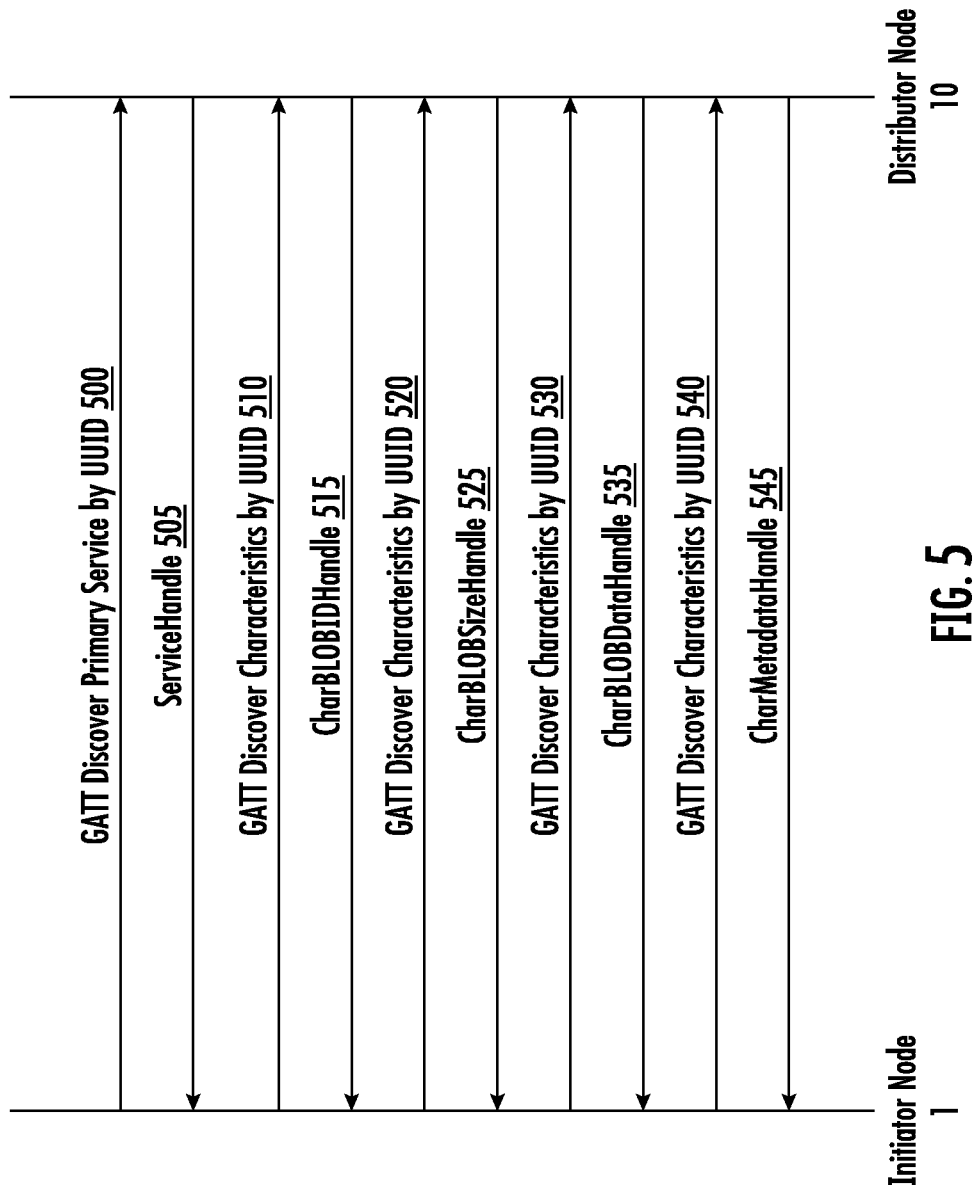
FIG. 5 is a diagram showing the process by which the initiator node discovers the characteristics in the GATT database.

FIG. 5 shows a sequence that may be used to determine the services and characteristics associated with the OOB firmware upload when the GATT database 200 is disposed in the distributor node 10. This figure expands on Box 410 shown in FIG. 4 and is performed after the BLE connection is created.

First, as shown at line 500, the initiator node 1 initiates a GATT Discover Primary Services procedure. In this procedure, the initiator node 1 sends 'Read By Group Type' Requests with the handle UUID set to the UUID of 'Primary Service'. The Service handles will arrive in the response. In some embodiments, the OOB firmware Upload Service is assigned a specific universal unique identifier (UUID). In this embodiment, the initiator node 1 may discover the service using its preassigned UUID. In response, in line 505, the distributor node 10 returns the handle for the service. This may be similar to an address. In another embodiment, the initiator node 1 may execute a "Discover all Primary Services" procedure to obtain the UUID of the OOB firmware Upload Service. Next, the initiator node 1 initiates a GATT Discover Characteristics procedure, as shown in line 510. As noted above, in some embodiments, each characteristic has a predetermined UUID. In this scenario, the initiator node 1 may discover the BLOB ID characteristic using its preassigned UUID. In response, in line 515, the distributor node 10 returns the handle for the BLOB ID characteristic. The initiator node 1 and the distributor node 10 repeat this process to obtain the handle for the BLOB Size characteristic (lines 520-525), the BLOB Data characteristic (lines 530-535) and the Metadata characteristic (lines 540-545). After this sequence is completed, the initiator node 1 has the handle for the OOB firmware upload service and all of its associated characteristics.

Note that this is an illustration of one embodiment. In other embodiments, the initiator node 1 may obtain the handles in a different way. For example, in certain embodiments, the initiator node 1 may know the arrangement of the entire GATT database of the distributor node 10. In this case, no discovery would be needed.

Having described the structure of the GATT database 200 and the process by which the initiator node 1 determines the handles for each characteristic in the OOB firmware upload service, a description of the actual process to upload the new firmware image will be presented.

Figure 6:
FIG. 6 shows the sequence used to upload the firmware image to the distributor node according to one embodiment.

FIG. 6 shows a sequence that may be used to upload a new firmware image to the distributor node 10 from the initiator node 1 using a GATT database 200 disposed in the distributor node 10.

The sequence begins with the initiator node 1 generating a random number which will be the BLOB ID, as shown in Box 600. As shown in line 610, the initiator node 1 then transmits an ATT Write Request to the distributor node 10, providing the handle for the BLOD ID characteristic and the random number generated in Box 600.

If this operation is successful, the distributor node 10 transmits a Write Response with a status of success or "OK", as shown in line 615.

As shown in line 620, the initiator node 1 then transmits an ATT Write Request to the distributor node 10, providing the handle for the BLOD Size characteristic and the size of the new firmware image.

If this operation is successful, the distributor node 10 transmits a Write Response with a status of success or "OK", as shown in line 625.

As shown in line 630, the initiator node 1 then transmits an ATT Write Request to the distributor node 10, providing the handle for the metadata characteristic and any metadata.

If this operation is successful, the distributor node 10 transmits a Write Response with a status of success or "OK", as shown in line 635.

At this time, all of the parameters associated with the firmware upload have been provided to the GATT database 200. Note that these ATT Write Requests may be performed in any order. Each of these operations was performed using standard Bluetooth LE (BLE) messages.

Having configured the GATT database 200, the initiator node 1 may then initiate the upload of the firmware image. This may be done by transmitting a Mesh Firmware Distribution Upload OOB Start message, as shown in line 640. The initiator node 1 may utilize the Mesh Proxy service and transmit this message to the distributor node 10 using the GATT bearer. In another embodiment, the initiator node 1 may utilize an ADV bearer and send the Mesh Firmware Distribution Upload OOB Start mesh model message in one or more advertisements. The Mesh Firmware Distribution Upload OOB Start message includes several parameters, including the firmware ID, Upload OOB URI Length and the Upload OOB URI, which are used to define the URI that the distributor node 10 is to receive the firmware image from. In this scenario, there is no internet connection, and, in certain embodiments, the BLOB ID is coded into the Upload URI field. The BLOB ID described here is the same as that written to the BLOB ID characteristic in the GATT database 200. This allows the distributor node 10 to ensure that the firmware image that is going to be uploaded is the same as that identified in the GATT database 200. Note that this message is a standard Bluetooth Mesh packet and therefore conforms to the Bluetooth Mesh specification. If the packet was successfully received, the distributor node 10 will respond with a Mesh Firmware Distribution Upload Status message, which provides a status of success or "OK", as shown in line 645.

At this time, the upload may begin. To transfer the firmware image to the distributor node 10, as shown in line 660, the initiator node 1 uses ATT Write Request protocol data units (PDUs). These are BLE PDUs and therefore do not have the constraints associated with mesh messages. Specifically, the maximum length of these ATT PDUs, referred to as MTU (maximum transmission unit) is negotiated between the initiator node 1 and the distributor node 10. The Bluetooth LE specification allows a much larger maximum value on this MTU than is possible with Bluetooth Mesh protocol. Thus, the number of bytes that can be transferred in a single ATT write request may be as large as desired. Further, there is no need to wait segment intervals between ATT write requests. Thus, the amount of data transmitted in a single write request, referred to as a data block, may be larger than is possible using the Mesh upload procedures. The ATT Write Request PDU has parameters that include the handle of the BLOB Data as well as the data block to be written.

If the initiator node 1 used the ATT Write Request PDU to transmit the data block, the distributor node 10 will respond with an ATT Write Response PDU, as shown in line 665. This ATT Write Response indicates the status of the previous write operation. If the operation was unsuccessful, the initiator node 1 may abort the firmware upload or may retransmit the same data block again. If the operation was successful, the initiator node 1 will transmit the next data block. Thus, lines 660 and 665 form a loop 650, that is repeated as many times as necessary to transmit the entire firmware image.

After the entire firmware image has been transferred, the initiator node 1 may then transmit another Bluetooth mesh PDU, referred to as a Mesh Firmware Distribution Upload Get PDU, as shown in line 670. As described above, the initiator node 1 may utilize the Mesh Proxy service and transmit this message to the distributor node 10 using the GATT bearer. In another embodiment, the initiator node 1 may utilize an ADV bearer and send the Mesh Firmware Distribution Upload GET mesh model message in one or more advertisements. The distributor node 10 may then respond using a Mesh Firmware Distribution Upload Status PDU, as shown in line 675, which provides the status of the entire transfer.

Note that rather than using Write Request PDUs to transfer the BLOB Data, the initiator node 1 may utilize the Write Command PDU. This command is similar to the Write Request; however, no response is provided by the distributor node 10. Thus, loop 650 would comprise a plurality of ATT Write Command PDUs with no responses. This approach has the advantage of faster upload time, however, this approach is less robust, as any errors may only be detected after the entire transfer is complete.

Thus, this disclosure describes a method of uploading a new firmware image to a distributor node in a Bluetooth mesh network. This method uses standard Bluetooth Low Energy (BLE) data transfers to transmit the firmware image from the initiator node 1 to the distributor node 10. In this disclosure, a method that uses a GATT database disposed in the distributor node 10 is described. The specific configuration of the GATT database 200 is implementation specific and may be configured differently than described herein. However, in the embodiments that use a GATT database, one of the characteristics of the GATT database is "data", which allows the initiator to transfer data blocks to the GATT database 200 using BLE data transfers.

Figure 7:
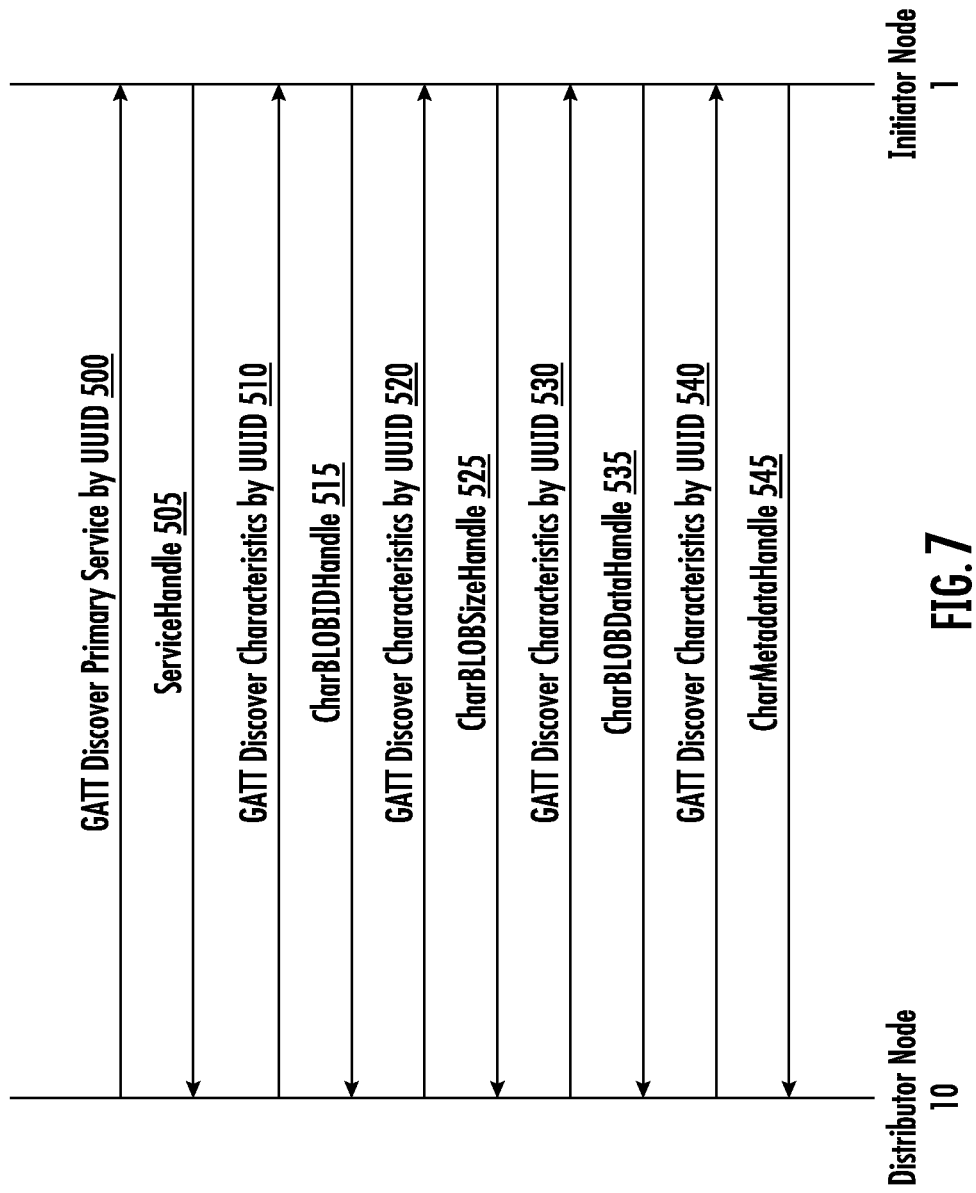
FIG. 7 is a diagram showing the process by which the distributor node discovers the characteristics in the GATT database.

Note that there are other techniques that may use standard Bluetooth Low Energy (BLE) data transfers to transmit the firmware image. For example, the GATT database 200 may be disposed on the initiator node 1. In this embodiment, much of the procedure described above is still utilized. Specifically, the sequence shown in FIG. 4 is unchanged. Further, in this embodiment, the distributor node 10 performs the service and characteristics discovery (see Box 410 in FIG. 4). Thus, the sequence shown in FIG. 7 is utilized. The operations performed are similar to those shown in FIG. 5, however, the transactions are reversed, such that the distributor node 10 is the device performing the discovery procedure. Consequently, for ease of understanding, the same reference designators are used in FIG. 7.

Figure 8:
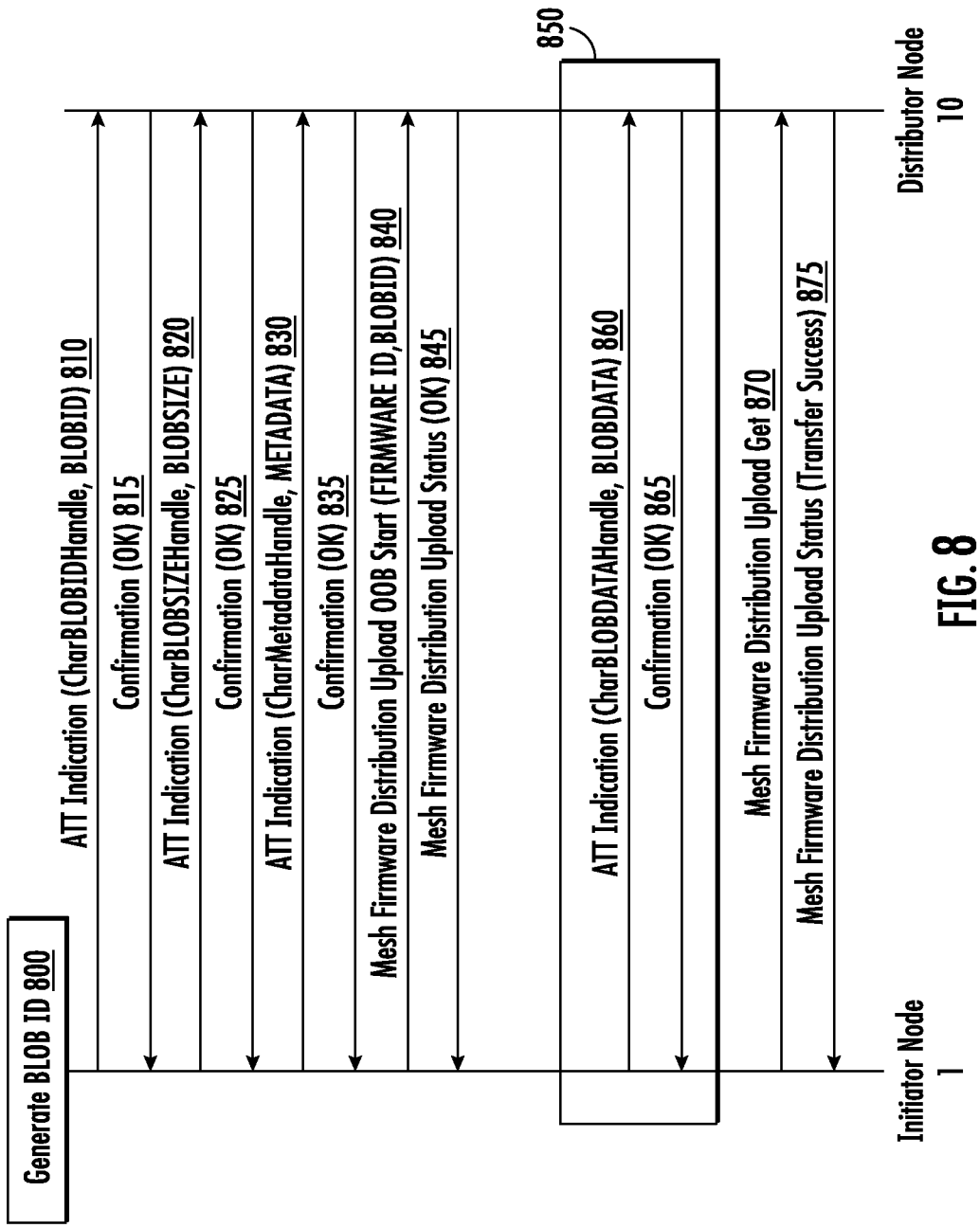
FIG. 8 shows the sequence used to upload the firmware image to the distributor node according to a second embodiment.

The firmware upload procedure (see Box 420) is described in FIG. 8. In this embodiment, ATT Indications, Notifications and Confirmations may be used. Specifically, when the initiator node 1 has new information in its GATT database 200, it may wish to communicate this data to the distributor node 10. Thus, unlike FIG. 6, where the initiator node 1 is writing data to the GATT database 200 located in the distributor node 10, in this embodiment, the initiator node 1 writes to the local GATT database and ATT PDUs are used to push this information to the GATT client, which is the distributor node 10.

The sequence begins with the initiator node 1 generating a random number which will be the BLOB ID, as shown in Box 800. The initiator node 1 writes this BLOB ID value to the local GATT database 200. Then, as shown in line 810, the initiator node 1 then transmits an ATT Indication to the distributor node 10, providing the handle for the BLOD ID characteristic and the random number generated in Box 800.

If this operation is successful, the distributor node 10 transmits a Confirmation with a status of success or "OK", as shown in line 815.

As shown in line 820, the initiator node 1 updates the BLOB Size characteristic in the local GATT Database 200 and then transmits an ATT Indication to the distributor node 10, providing the handle for the BLOD Size characteristic and the size of the new firmware image.

If this operation is successful, the distributor node 10 transmits a Confirmation with a status of success or "OK", as shown in line 825.

As shown in line 830, the initiator node 1 then updates the metadata characteristic in the local GATT Database 200 and transmits an ATT Indication to the distributor node 10, providing the handle for the metadata characteristic and any metadata.

If this operation is successful, the distributor node 10 transmits a Confirmation with a status of success or "OK", as shown in line 835.

At this time, all of the parameters associated with the firmware upload have been provided to the GATT database 200 and pushed to the distributor node 10. Note that these ATT Indications may be performed in any order. Each of these operations was performed using standard Bluetooth LE (BLE) messages.

Having configured the GATT database 200, the initiator node 1 may then initiate the upload of the firmware image. This may be done by transmitting a Mesh Firmware Distribution Upload OOB Start message, as shown in line 840. This Upload OOB Start message is the same as that described above with respect to line 640. Note that this message is a standard Bluetooth Mesh packet and therefore conforms to the Bluetooth Mesh specification. As described above, this may be done using a Mesh Proxy Service disposed in the GATT database 200. If the packet was successfully received, the distributor node 10 will respond with a Mesh Firmware Distribution Upload Status message, which provides a status of success or "OK", as shown in line 845.

At this time, the upload may begin. To transfer the firmware image to the distributor node 10, as shown in line 860, the initiator node 1 writes blocks of the new firmware image to the local GATT database 200. The initiator node 1 then uses ATT Indication protocol data units (PDUs). These are BLE PDUs and therefore do not have the constraints associated with mesh messages. As described above, the amount of data transmitted in a single indication, referred to as a data block, may be larger than is possible using the Mesh upload procedures. The ATT Indication PDU has parameters that include the handle of the BLOB Data as well as the data block to be written.

If the initiator node 1 used the ATT Indication PDU to transmit the data block, the distributor node 10 will respond with an ATT Confirmation PDU, as shown in line 865. This ATT Confirmation indicates the status of the previous indication operation. If the operation was unsuccessful, the initiator node 1 may abort the firmware upload or may retransmit the same data block again. If the operation was successful, the initiator node 1 will transmit the next data block. Thus, lines 860 and 865 form a loop 850, that is repeated as many times as necessary to transmit the entire firmware image.

After the entire firmware image has been transferred, the initiator node 1 may then transmit another Bluetooth mesh PDU, referred to as a Mesh Firmware Distribution Upload Get PDU, as shown in line 870. The distributor node 10 may then respond using a Mesh Firmware Distribution Upload Status PDU, as shown in line 875, which provides the status of the entire transfer.

Note that rather than using Indication PDUs to transfer the BLOB Data, the initiator node 1 may utilize the Notification PDU. This PDU is similar to the Indication, however, no response is provided by the distributor node 10. Thus, loop 850 would comprise a plurality of ATT Notification PDUs with no responses. This approach has the advantage of faster upload time, however, this approach is less robust, as any errors may only be detected after the entire transfer is complete.

Thus, the process of uploading a new firmware image to a distributor node 10 may be performed with the GATT database 200 disposed in either the initiator node 1 or the distributor node 10.

Further, in another embodiment, the firmware upload is performed without the use of a GATT database 200. For example, the firmware image may be uploaded using an L2CAP channel without the use of a GATT database. In this embodiment, the information described above is transmitted using an L2CAP channel. L2CAP allows use of credit based flow control. In this embodiment, the initiator node 1 and the distributor node 10 negotiate the number of credits, the maximum transmission unit (MTU) of a SDU (service data unit) and the maximum payload size (MPS) of a single L2CAP packet, which is an LE frame. A credit is defined as permission to transmit one LE frame. The initiator node 1 may begin with "N" credits. Credits are depleted by the initiator node 1 each time it transmits a LE frame, and replenished when the distributor node 10 returns the credit. Thus, the distributor node can control the rate at which the initiator node 1 transmits the new firmware image. The use of MTU and MPS allows the size of a SDU to be different from the size of a LE frame. For example, if MTU is 1024, but MPS is 256, each SDU Is 1024 bytes long, but the initiator node 1 must split this SDU into multiple LE frames, each with a maximum payload of 256 bytes. Further, the distributor node 10 can throttle the transfer of the new firmware image by delaying return of credits to the initiator node.

In operation, each SDU includes a length field and then a payload. If a SDU is split into multiple LE frames, the length field only appears in the first LE frame associated with this SDU. Assuming that the initiator node 1 wishes the transmit the same information as was described with respect to the GATT database 200, the initiator node 1 may transmit a SDU wherein the payload includes a length field, a command identifier field, which defines the data being transmitted (i.e. BLOBSIZE, BLOBID, METADATA, BLOBDATA), and the data being sent. Note that for the actual firmware image (i.e. the BLOBDATA), multiple SDUs may be required. As noted above, other or additional parameters may be used to identify and transmit the firmware image to the distributor node 10.

The use of an L2CAP channel replaces Boxes 410-420 in FIG. 4. Thus, instead of service discovery and upload of the firmware image using a GATT database, these steps are replaced by transmission of the firmware image, and any necessary parameters or metadata, through use of a L2CAP channel. Finally, as described above, after the distributor node 10 receives the firmware image, it distributes it to the mesh nodes 2a-2c using a well defined Bluetooth Mesh procedure.

The present system and method has many advantages. Currently, the Bluetooth Mesh specification details two upload procedures. Both of these procedures are very time consuming with effective data rates of less than 2 kB/sec. The method described herein achieves at least an order of magnitude improvement in transfer rate, thereby significantly reducing the time required to upload a new firmware image to the distributor node. Further, this procedure is fully compliant with the Bluetooth Mesh specification, which does permit out of band upload procedures. Furthermore, the protocol overhead associated with mesh packets is significant, and therefore the proprietary protocol may be much faster because the ratio of the size of the payload to the total bytes in the PDU is much improved.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of uploading a new firmware image to one or more network devices in a Bluetooth mesh network, comprising:
    transmitting from an initiator node a standard Bluetooth Mesh packet, referred to as a Mesh Firmware Distribution Upload Out of Band (OOB) Start Protocol Data Unit (PDU), which indicates an out of band firmware upload is being commenced;
    uploading the new firmware image from the initiator node to a distributor node, wherein the new firmware image is transferred using Bluetooth Low Energy (BLE) protocol data units (PDUs);
    transmitting from the initiator node a standard Bluetooth Mesh packet, referred to as a Mesh Firmware Distribution Upload Get PDU, to obtain status of the firmware upload; and using the distributor node to transmit the new firmware image to the one or more network devices using standard Bluetooth Mesh PDUs.

2. The method of claim 1, wherein the initiator node uses a proxy node to transmit the Mesh Firmware Distribution Upload OOB Start PDU and Mesh Firmware Distribution Upload Get PDU.

3. The method of claim 2, wherein the distributor node serves as the proxy node.

4. The method of claim 1, wherein the initiator node uses mesh advertisements to transmit the Mesh Firmware Distribution Upload OOB Start PDU and Mesh Firmware Distribution Upload Get PDU.

5. The method of claim 1, wherein the new firmware image is transmitted to the distributor node through use of a Generic Attribute Profile (GATT) database.

6. The method of claim 5, wherein the GATT database comprises an Out of Band (OOB) Firmware Upload Service.

7. The method of claim 5, wherein the GATT database is disposed in the distributor node.

8. The method of claim 7, wherein the initiator node uses a proxy node to transmit the Mesh Firmware Distribution Upload OOB Start PDU and Mesh Firmware Distribution Upload Get PDU, and wherein the GATT database comprises a Mesh Proxy service.

9. The method of claim 5, wherein the GATT database is disposed in the initiator node.

10. The method of claim 1, wherein the new firmware image is transmitted through use of a Logical Link Control and Adaptation Protocol (L2CAP) channel.

11. The method of claim 1, wherein prior to uploading the new firmware image, the initiator node creates a BLE connection to the distributor node.

12. The method of claim 11, wherein the BLE connection is created using Low Energy (LE) Secure Connection Pairing with Encryption.

13. The method of claim 11, wherein the new firmware image is transmitted using the BLE connection.

14. A system for updating firmware to a plurality of mesh devices in a Bluetooth mesh network, comprising:
a distributor node, comprising a processing unit, a memory device, and a Bluetooth network interface, the distributor node in communication with the plurality of mesh devices in the Bluetooth mesh network, wherein the distributor node comprises a Generic Attribute Profile (GATT) database, the GATT database comprising an Out of Band (OOB) Firmware Upload Service; and
an initiator node, which contains a Bluetooth interface and a new firmware image, wherein the initiator node creates a Bluetooth Low Energy (BLE) connection to the distributor node and transmits the new firmware image to the distributor node using the GATT database.

15. The system of claim 14, wherein the initiator node transmits a standard Bluetooth Mesh packet, referred to as a Mesh Firmware Distribution Upload OOB Start Protocol Data Unit (PDU), which indicates an out of band firmware upload is being commenced, prior to transmitting the new firmware image.

16. The system of claim 15, wherein the initiator node transmits a standard Bluetooth Mesh packet, referred to as a Mesh Firmware Distribution Upload Get PDU, to obtain status of the firmware upload after transmitting the new firmware image.

17. The system of claim 16, wherein the GATT database comprises a Mesh Proxy service, and the initiator node transmits the Mesh Firmware Distribution Upload OOB Start PDU and the Mesh Firmware Distribution Upload Get PDU using the Mesh Proxy Service.

18. The system of claim 14, wherein the BLE connection is created using Low Energy (LE) Secure Connection Pairing with Encryption.

* * * * *